US012474682B2

(12) United States Patent
Golisch et al.

(10) Patent No.: US 12,474,682 B2
(45) Date of Patent: Nov. 18, 2025

(54) SWITCHING FREQUENCY VARIATION FOR A MOTOR

(71) Applicant: Infineon Technologies AG, Neubiberg (DE)

(72) Inventors: Stefan Golisch, Erfurt (DE); Sandro Purfürst, Illmenau (DE)

(73) Assignee: Infineon Technologies AG, Neubiberg (DE)

( * ) Notice: Subject to any disclaimer, the term of this patent is extended or adjusted under 35 U.S.C. 154(b) by 480 days.

(21) Appl. No.: 18/056,202

(22) Filed: Nov. 16, 2022

(65) Prior Publication Data

US 2024/0160167 A1    May 16, 2024

(51) Int. Cl.
*H02P 27/04* (2016.01)
*G05B 15/02* (2006.01)
*G06F 7/58* (2006.01)
*H02P 21/18* (2016.01)

(52) U.S. Cl.
CPC .............. *G05B 15/02* (2013.01); *G06F 7/58* (2013.01); *H02P 21/18* (2016.02); *H02P 27/04* (2013.01)

(58) Field of Classification Search
CPC . G05B 15/02; G06F 7/58; H02P 21/18; H02P 27/04
See application file for complete search history.

(56) References Cited

U.S. PATENT DOCUMENTS

| | | | |
|---|---|---|---|
| 2009/0144351 A1* | 6/2009 | Rueping | G06F 7/588 708/255 |
| 2013/0317630 A1* | 11/2013 | Schulz | H02P 23/04 700/275 |
| 2017/0244399 A1* | 8/2017 | Yang | H02M 7/53871 |
| 2020/0028460 A1* | 1/2020 | Lee | H02P 21/22 |

OTHER PUBLICATIONS (Ki-Seon Kim, Young-Gook Jung, and Young-Cheol Lim, A New Hybrid Random PWM Scheme, Jan. 2009, IEEE Transactions on Power Electronics, vol. 24, No. 1, pp. 192-200) (Year: 2009).*

* cited by examiner

*Primary Examiner* — Michael W Choi
(74) *Attorney, Agent, or Firm* — Shumaker & Sieffert, P.A.

(57) ABSTRACT

A controller circuit is configured to generate, using a random number generator, a set of bits and determine a switching frequency using the set of bits. The controller circuit is further configured to control a switching circuit to switch at the switching frequency to drive a motor.

20 Claims, 5 Drawing Sheets

SWITCHING FREQUENCY VARIATION FOR A MOTOR

TECHNICAL FIELD

This disclosure relates to circuits and techniques for generating a control signal, and more specifically, techniques for generating a control signal associated with operating or controlling an electric motor.

BACKGROUND

Operation of a motor may be performed by a controller. The controller controls a rotor rotation of the motor based on a position of the rotor relative to stator coils of the motor. For example, the controller may control inverter circuitry to provide power from a voltage rail to each phase of the motor based on the rotor position to provide a desired rotor speed and/or torque.

SUMMARY

In general, this disclosure is directed to techniques for determining a switching frequency for motor operation that randomly varies. Randomly varying the switching frequency may reduce or eliminate significant amplitudes at particular frequencies in the frequency spectrum. Moreover, randomly varying the switching frequency may reduce or eliminate emitting undesirable electro-magnetic disturbances and/or emitting audible noises. For example, a controller circuit may use a random number generator to generate the switching frequency (optionally scaled) or to generate a frequency change value (optionally scaled). In some examples, a set of bits generated by the random number generator may be further randomized using one or more of an output from an analog-to-digital converter (ADC), a function (e.g., a cryptographic function), or a look-up table, which may help to reduce the amplitudes at particular frequencies in the frequency spectrum.

In one example, this disclosure describes a controller circuit configured to generate, using a random number generator, a set of bits and determine a switching frequency using the set of bits. The controller circuit is further configured to control a switching circuit to switch at the switching frequency to drive a motor.

In another example, this disclosure describes a method including generating, using a random number generator, a set of bits and determining a switching frequency using the set of bits. The method further includes controlling a switching circuit to switch at the switching frequency to drive a motor.

In another example, this disclosure describes a system including a switching circuit, a random number generator, and a controller circuit. The controller circuit is configured to generate, using the random number generator, a set of bits, determine a switching frequency using the set of bits, and control the switching circuit to switch at the switching frequency to drive a motor.

Details of these and other examples are set forth in the accompanying drawings and the description below. Other features, objects, and advantages will be apparent from the description and drawings, and from the claims.

DETAILED DESCRIPTION

Electric drives (e.g., motors operating as a load and/or generator) may be operated with pulse-width modulated (PWM) pulses of constant frequency being provided to power switches. The constant frequency may lead to significant amplitudes at particular frequencies in the frequency spectrum and can emit undesirable electro-magnetic disturbances and even audible noises. To address these issues, some systems may use predetermined look up tables in combinations with pseudo-randomly and/or offline generated values for the PWM period and/or frequency, which may add complexity to store the generated values.

In accordance with the techniques of the disclosure, a system may achieve PWM frequency variation using a random number generator. For example, the random number generator may provide real randomization (e.g., true random) using ADC measurements, or other mathematical transformations, or possible combinations to provide a directly usable PWM frequency value (e.g., scaled or used without scaling) or a PWM frequency change (e.g., scaled or used without scaling) or an index for table-based frequency generation if predetermined values are used.

Figure 1:
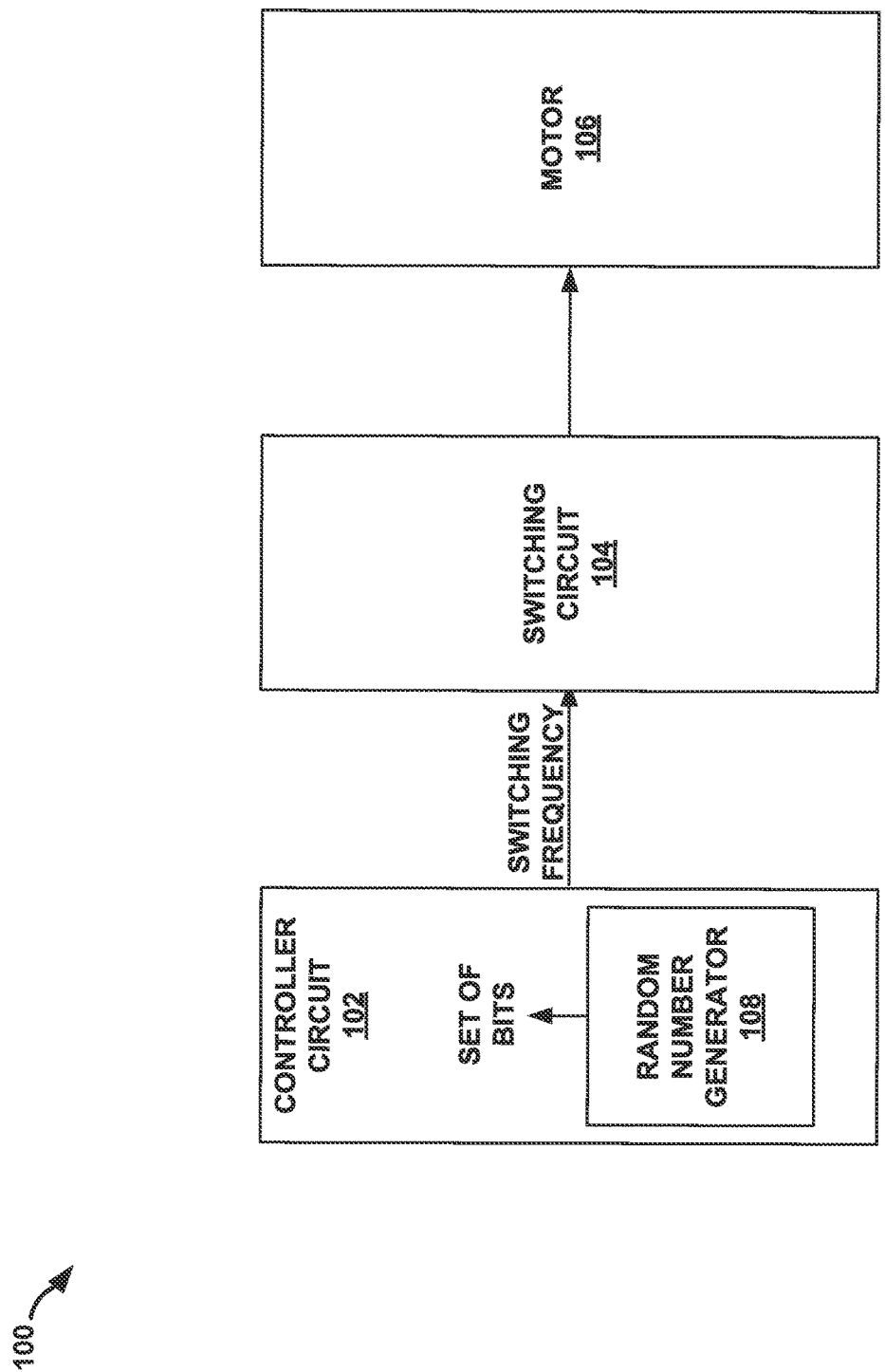
FIG. 1 is a block diagram illustrating an example system for controlling a motor, in accordance with one or more techniques of this disclosure.

FIG. 1 is a block diagram illustrating an example system 100 for controlling a motor 106, in accordance with one or more techniques of this disclosure. As illustrated in the example of FIG. 1, system 100 may include controller circuit 102, switching circuit 104, motor 106, and random number generator 108.

Motor 106 may include, for example, a permanent magnet synchronous motor (PMSM), an externally excited motor, or an asynchronous motor. Motor 106 may operate as only a load to produce mechanical energy, only a generator to produce electrical energy, or both a motor and a generator. For example, a PMSM may include a shaft, rotor, stator, and permanent magnet. A permanent magnet may be mounted on or in the rotor. In some examples, the permanent magnet may be surface mounted to the rotor, inset in the rotor, or buried within the rotor.

Switching circuit 104 may be configured to drive motor 106 based on the switching frequency. For example, switching circuit 104 may control one or more switching elements to provide a first phase voltage ($V_A$), a second phase voltage ($V_B$), and a third phase voltage ($V_C$) to motor 106 by varying a duty cycle and switching at the switching frequency. For instance, switching circuit 104 may PWM switch, at the switching frequency, each phase voltage to a supply voltage or the reference voltage.

Controller circuit 102 may be configured to determine the switching frequency based on a set of bits output by random number generator 108. For example, controller circuit 102 may scale the set of bits (e.g., multiply by a factor) or directly use the set of bits to calculate the switching frequency. In some examples, controller circuit 102 may scale the set of bits or directly use the set of bits to calculate a frequency change value. In this example, controller circuit 102 may add the frequency change value to a frequency value (e.g., 10 kHz, 20 kHz, etc.) to generate the switching frequency. In some examples, controller circuit 102 may use the set of bits to determine an index value of an array. In this example, controller circuit 102 may determine the switching frequency or a frequency change value using a predetermined value of the array corresponding to the index value. Controller circuit 102 may include one or more processors, such as one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

Random number generator 108 may include one or more of a cryptographic function, a pseudo-random number generator, or a true random number generator. In some examples, random number generator 108 may include only software (e.g., a function), only hardware, or a combination of hardware and software. As discussed with respect to FIG. 4, random number generator 108 may include or use values generated by an ADC.

In accordance with the techniques of the disclosure, controller circuit 102 may generate, using random number generator 108, a set of bits. In this example, controller circuit 102 may determine a switching frequency using the set of bits. Controller circuit 102 may control switching circuit 104 to switch at the switching frequency to drive motor 106. In this way, system 100 may generate the switching frequency reduce or eliminate significant amplitudes at particular frequencies in the frequency spectrum and/or reduce or eliminate undesirable electro-magnetic disturbances and audible noises. Moreover, system 100 may use random number generator 108 without a predetermined look up table, which may help to simplify the complexity of system 100.

Figure 2:
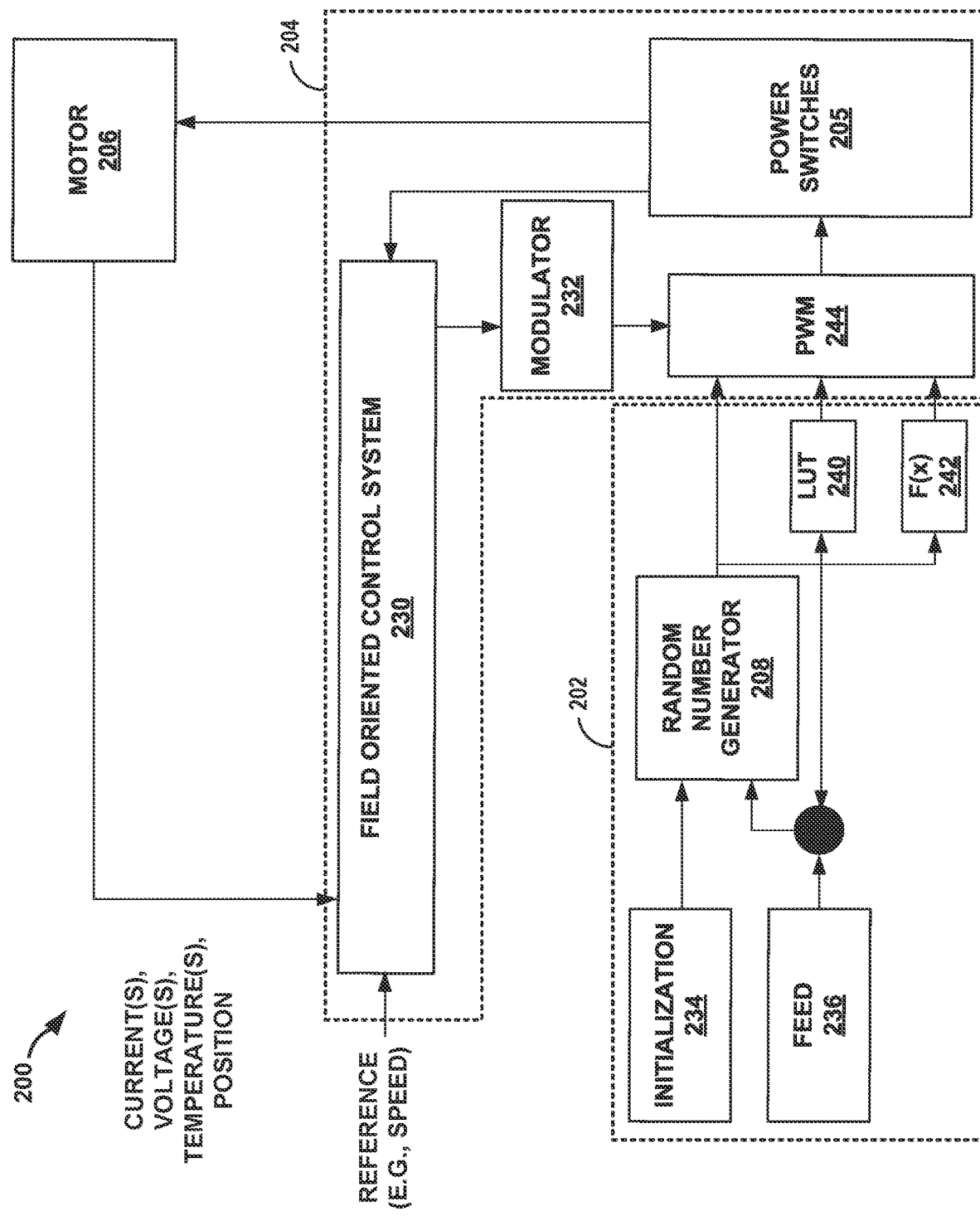
FIG. 2 is a conceptual diagram illustrating an example of a controller circuit controlling a motor, in accordance with one or more techniques of this disclosure.

FIG. 2 is a conceptual diagram illustrating an example of a controller circuit 202 controlling a motor 206, in accordance with one or more techniques of this disclosure. FIG. 2 is discussed with FIG. 1 for example purposes only. As illustrated in the example of FIG. 1, system 200 may include controller circuit 202, switching circuit 204, and motor 206. Controller circuit 202 includes initialization 234, feed 236, random number generator 208, look-up table (LUT) 240, and function "F(x)" 242. Switching circuit 204 may include field oriented control system 230, modulator 232, and PWM 244. In some examples, LUT 240 and/or F(x) 242 may be omitted. For example, PWM 244 may only receive the output from random number generator 208. Field oriented control system 230 may generate a duty cycle for modulator 232 based on a reference (e.g., a rotor speed at motor 206) and one or more of a phase and/or supply current, a phase and/or supply voltage, a temperature, or a rotor position of motor 206.

In the example of FIG. 2, PWM 244 generates switching signals for power switches 205 depending on a period value (e.g., from one or more of random number generator 208, LUT 240, or F(x) 242) and a desired duty cycle value (e.g., from modulator 232). Modulator 232 may determine the duty cycle value to force a desired average motor voltage. LUT 240 and/or F(x) 242 may determine a period value to correspond to the frequency of the PWM signal (e.g., a reciprocal of a switching frequency). LUT 240 and/or F(x) 242 may generate the period value (or switching frequency) using random number generator 208. For instance, controller circuit 202 may use the set of bits output by random number generator as an input (e.g., an index value) for LUT 240 to generate an output (e.g., a value stored in the LUT 240 that corresponds to the set of bits output by random number generator 208). For instance, controller circuit 202 use the set of bits output by random number generator as an input for F(x) 242 to generate an output (e.g., a value generated in response to the set of bits output by random number generator 208).

Random number generator 208 may generate randomized values, which can either directly be used as a value (e.g., optionally scaled) for the switching frequency, frequency change value, or as an index to enter a predefined set of frequency values (e.g. organized in an array). Random number generator 208 can also be initialized (e.g., initialization 234) with randomly achieved values, and/or can be fed (e.g., feed 236) with a last output from random number generator 208, or with concatenation of feed and the last output from random number generator 208.

Initialization 234, feed 236, and random number generator 208 may use one or more of an ADC measurement, predefined values, or additionally further mathematical calculations for real or pseudo randomization to produce the final number (e.g., a set of bits), which may be used for further transformation (e.g., scaling) to calculate a varying frequency (e.g., a frequency change value) or a switching frequency.

Figure 3:
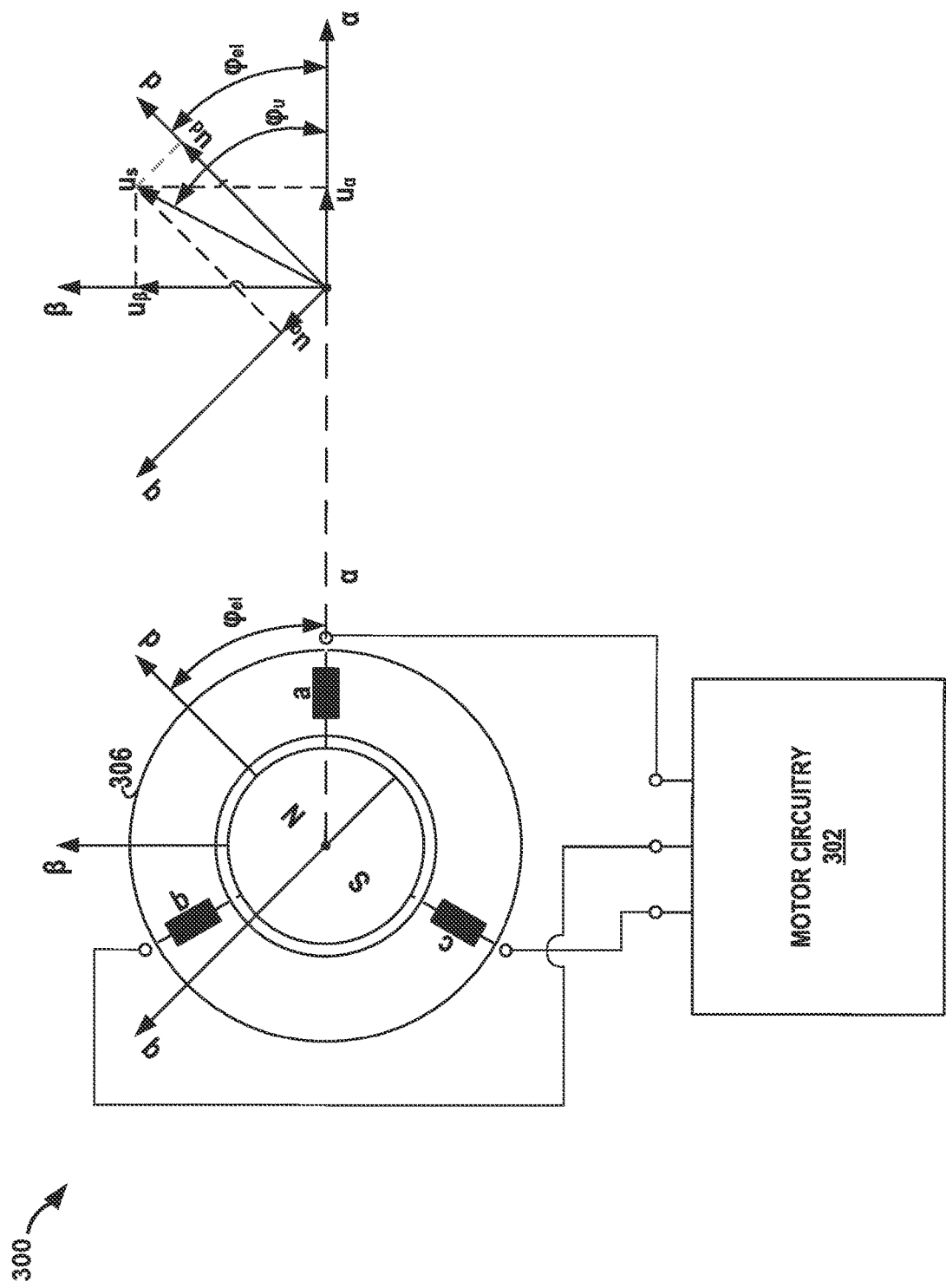
FIG. 3 is a conceptual diagram illustrating example motor control, in accordance with one or more techniques of this disclosure.

FIG. 3 is a conceptual diagram illustrating example motor control, in accordance with one or more techniques of this disclosure. FIG. 3 is discussed with FIGS. 1-2 for example purposes only. In this example, motor 306 comprises a 3-phase PMSM/BLDC (e.g., with a wye connection or a delta connection), which is connected to motor circuitry 302. In the example of FIG. 3, motor 306 comprises a first phase (a), a second phase (b), and a third phase (c). Motor circuitry 302 may include a combination of controller circuit 102 and switching circuit 104.

Motor circuitry 302 may apply voltages to motor 306 and may evaluate the signals for the described method. For example, motor circuitry 302 may apply voltages $V_A$, $V_B$, $V_C$ of FIG. 1 to motor 106 and may evaluate the resulting phase currents $I_A$, $I_B$, $I_C$ of motor 106.

The control voltage vector $u_S$ can be represented in polar coordinates (voltage amplitude+angle $\varphi_u$). Motor circuitry 302 may generate the control vector $u_S$ for motor startup and continuous motor operation based on a control voltage angle ($\varphi_u$) and a control voltage amplitude $|u_S|$. Motor circuitry 302 may generate the control voltage angle based on the difference of two phase current signals with an equal sign. Motor circuitry 302 may generate the control voltage amplitude using an output control algorithm.

Figure 4:
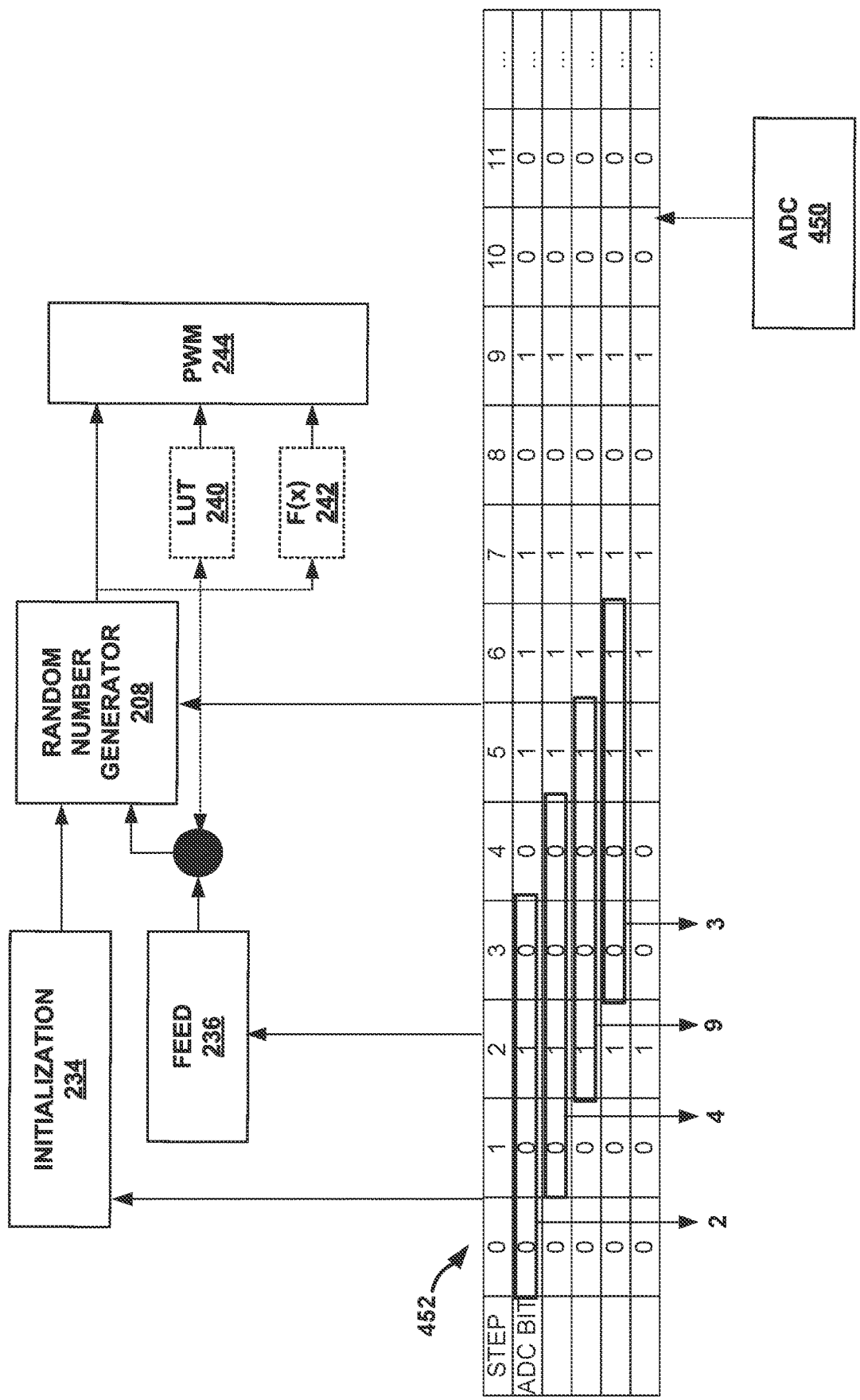
FIG. 4 is a conceptual diagram illustrating an example of generating a random number using an analog-to-digital converter (ADC), in accordance with one or more techniques of this disclosure.

FIG. 4 is a conceptual diagram illustrating an example of generating a random number using an analog-to-digital converter (ADC) 450, in accordance with one or more techniques of this disclosure. FIG. 4 is discussed with FIGS. 1-3 for example purposes only. ADC 450 may be part of controller circuit 102 or may be separate from controller circuit 102.

In motor control applications, a permanent analog-to-digital (AD) conversion may be used, for example, to determine or estimate one or more of a current, a voltage, or temperature. For example, an ADC 450 may sample values in each PWM cycle to determine real random numbers influenced by environmental surroundings (e.g., electromagnetic radiation etc.). Using the least significant bit (LSB) of each AD conversion may provide a value which randomly switches between one and zero. While this example uses one LSB, other examples, may use more than one LSB values. Sampling the LSB over 'n' number of PWM periods may help to create a real random number with 'n' bits, which can be seen as a FIFO storage. In every PWM cycle, where a new random bit comes from the measurement, controller circuit 102 may shift the bit into a 'n' bit long FIFO and shift the last bit of the FIFO. Controller circuit 102 may represent the real random number by the content of the FIFO storage. As described above, this number can be used in different ways to generate a varying PWM frequency.

In the example of FIG. 4, controller circuit 102 determines, with ADC 450, data sampled at a motor for each period of one or more switching periods. The data sampled at a motor may include, for example, one or more of a phase or supply voltage, a phase or supply current, a temperature, or a rotor position of the motor. Controller circuit 102 may generate a switching signal at the switching frequency to comprise a duty cycle. Controller circuit 102 may determine the duty cycle based on the data measured at the motor (see FIG. 3).

In some examples, controller circuit 102 may determine one or more least significant bits of the data sampled for each period of the one or more switching periods to generate a set of least significant bits. For example, controller circuit 102 may determine one or more first least significant bits of the data sampled for the first switching period. For instance, the one or more first least significant bits of the data sampled may include '0' for the first switching period (e.g., step 4). The one or more second least significant bits of the data sampled may include '0' for the second switching period (e.g., step 3). Similarly, further sets of least significant bits may include the '1' for step 2, '0' for step 1, and '0' for step 0 as shown in Table 452. In the example of FIG. 4, only one bit value is sampled each switching period (e.g., step). However, in some examples, more than one bit value may be sampled each switching period.

Again, controller circuit 102 may determine one or more least significant bits of the data sampled for each period of the one or more switching periods to generate a set of least significant bits. For example, controller circuit 102 may generate the set of least significant bits using previous least significant bits '1' from step 6 and '1' from step 5, the first set of least significant bits (e.g., '0') and the second set of least significant bit (e.g., '0') to generate [0, 0, 1, 1] or the value '3'. More specifically, controller circuit 102 may add at least the first set of least significant bits and the second set of least significant bits to a first in, first out (FIFO) array. For a subsequent switching period, controller circuit 102 may generate the set of least significant bits using previous least significant bit '1' from step 5, the first set of least significant bits (e.g., '0'), and the second set of least significant bit (e.g., '0'), and the third set of least significant bit (e.g., '1') from step 2 to generate [1, 0, 0, 1] or the value '9'. While the foregoing examples use a set of least significant bits of 4 bits, other examples, may use less than 3 bits or more than 4 bits.

In some examples, controller circuit 102 may determine a switching frequency or a frequency change value using the set of least significant bits as equal to the set of bits. In some examples, however, to generate the set of bits, controller circuit 102 may initialize random number generator 208 using the set of least significant bits (initialization 234). Similarly, to generate the set of bits, controller circuit 102 may feed random number generator 208 the set of least significant bits (feed 236). For example, controller circuit 102 may input random number generator 208 with one or more of the set of least significant bits or a previous output of random number generator 208 as a feed 236.

The output of random number generator 208 (e.g., '3', '9', '4', '2') may be directly output to a PWM 244. For example, controller circuit 102 may determine the switching frequency as the set of bits. In some examples, controller circuit 102 may scale the output of the random number generator (e.g., multiply by a factor) to determine the switching frequency.

Controller circuit 102 may determine a frequency change value based on the set of bits. For instance, controller circuit 102 may determine the frequency change value as equal to the set of bits or may determine the frequency change value as a scaled value of the set of bits. In this example, controller circuit 102 may determine the switching frequency using the frequency change value and a frequency value. The frequency value may be preconfigured (e.g., 10 kHz or 20 kHz) or determined by controller circuit 102.

The system of FIG. 4 may optionally include look-up table 240. For example, rather than outputting the set of bits to PWM 244 as described above, controller circuit 102 may determine an index value based on the set of bits. For instance, controller circuit 102 may use the set of bits as the index value or use a scaled or rounded result of the set of bits. In this example, controller circuit 102 may determine, using the index value, a predetermined value of an array as the frequency change value. In some examples, controller circuit 102 may determine, using the index value, a predetermined value of an array as the switching frequency.

The system of FIG. 4 may optionally include function 242 ("F(x) 242"). For example, rather than outputting the set of bits to PWM 244 as described above, controller circuit 102 may use the output of random number generator 208 as an input to function 242. Function 242 may include one or more of a cryptographic function or a pseudo-random number generator. In this example, controller circuit 102 may use the output of function 242 (e.g., optionally scaled) as either the frequency change value or the switching frequency as described above.

In this way, controller circuit 102 may provide one or more of the following advantages. System 100 may provide a generation of random numbers in order to reduce Electromagnetic compatibility (EMC) interference. System 100, particularly random number generator 208 and/or F(x) 242 may be implemented in hardware and/or software. System 100 may generate random numbers to be pseudo-random or true-random. System 100 may generate the PWM frequency, calculation (F(x)), and/or iterate in the set of bits to be real random and not predefined, which does not require register/storage/memory for lookup table values. System 100, when using F(x) 242 or a direct output from random number generator 208, may not have a fixed number of PWM frequencies, and thus may not result in PWM 244 generating a fixed pattern of frequencies.

Figure 5:
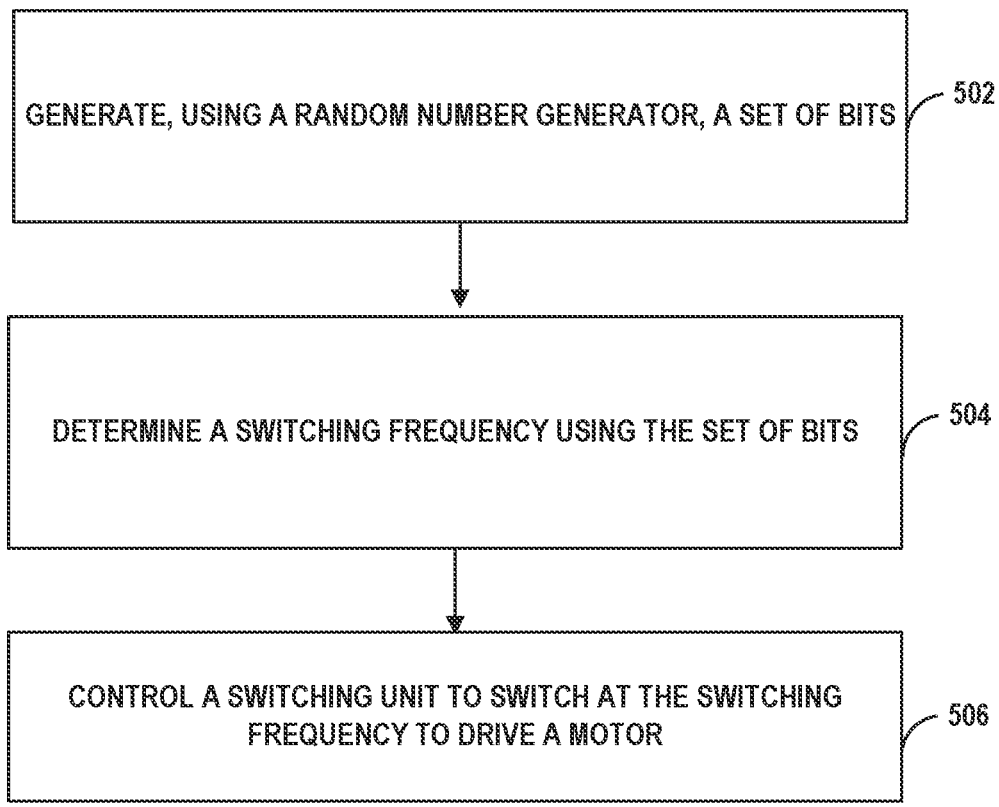
FIG. 5 is a flow diagram consistent with techniques that may be performed by the example system of FIG. 1, in accordance with this disclosure.

FIG. 5 is a flow diagram consistent with techniques that may be performed by the example system of FIG. 1, in accordance with this disclosure. FIG. 5 is discussed with reference to FIGS. 1-4 for example purposes only. In other examples, other systems or devices may also perform techniques of FIG. 5.

In accordance with the techniques of the disclosure, controller circuit 102 may generate, using a random number generator 108, a set of bits (502). Random number generator 108 may include one or more of a cryptographic function, a pseudo-random number generator, or a true random number generator.

In some examples, controller circuit 102 may determine the set of bits using an ADC. For example, controller circuit 102 may determine data sampled at motor 106 for each period of one or more switching periods. The data sampled at motor 106 may include one or more of a phase or supply voltage, a phase or supply current, a temperature, or a rotor position of the motor. In this example, controller circuit 102 may determine one or more least significant bits of the data sampled for each period of the one or more switching periods to generate a set of least significant bits. In some examples, the set of bits includes the set of least significant bits. In some examples, however, random number generator 108 is initialized using the set of least significant bits and/or fed the set of least significant bits (optionally with a previous output of random number generator 108), which may help to further randomize the set of bits. Similarly, in some examples, controller circuit 102 may use an output of the random number generator as an input to a function (F(x) 242)) or look-up table (e.g., LUT 240), which outputs the set of bits.

Controller circuit 102 may determine a switching frequency using the set of bits (504). For example, controller circuit 102 may determine the switching frequency using the set of bits or a scaled result of the set of bits. In some examples, controller circuit 102 may determine a frequency change value based on the set of bits (e.g., using the set of bits or a scaled result of the set of bits) and determine the switching frequency using the frequency change value and a frequency value (e.g., a preconfigured frequency). For instance, controller circuit 102 may add the frequency value and the frequency change value to generate the switching frequency.

In some examples controller circuit 102 may determine the switching frequency using a look-up table. For example, controller circuit 102 may determine an index value based on the set of bits and determine, using the index value, a predetermined value of an array. Controller circuit 102 may determine the switching frequency using the predetermined value or a scaled result of the predetermined value. In some examples, controller circuit 102 may determine a frequency change value using the predetermined value or a scaled result of the predetermined value. In this example, controller circuit 102 may add the frequency value and the frequency change value to generate the switching frequency.

Controller circuit 102 may control a switching circuit 104 to switch at the switching frequency to drive a motor 106 (506). For example, controller circuit 102 may generate a switching signal at the switching frequency to comprise a duty cycle. In some examples, controller circuit 102 may determine the duty cycle based on the data measured at motor 106.

The following examples may illustrate one or more aspects of the disclosure.

Clause 1. A controller circuit configured to: generate, using a random number generator, a set of bits; determine a switching frequency using the set of bits; and control a switching circuit to switch at the switching frequency to drive a motor.

Clause 2. The controller circuit of clause 1, wherein the random number generator comprises one or more of a cryptographic function, a pseudo-random number generator, or a true random number generator.

Clause 3. The controller circuit of any of clauses 1-2, wherein, to determine the switching frequency, the controller circuit is configured to: determine a frequency change value based on the set of bits; and determine the switching frequency using the frequency change value and a frequency value.

Clause 4. The controller circuit of clause 3, wherein, to determine the frequency change value, the controller circuit is configured to scale the set of bits to generate the frequency change value.

Clause 5. The controller circuit of clause 3, wherein, to determine the switching frequency, the controller circuit is configured to: determine an index value based on the set of bits; and determine, using the index value, a predetermined value of an array as the frequency change value.

Clause 6. The controller circuit of any of clauses 1-2, wherein, to determine the switching frequency, the controller circuit is configured to: determine an index value based on the set of bits; and determine, using the index value, a predetermined value of an array as the switching frequency.

Clause 7. The controller circuit of any of clauses 1-2, wherein the random number generator comprises an analog-to-digital converter (ADC), and wherein the controller circuit is further configured to: determine, using the ADC, data sampled at a motor for each period of one or more switching periods; determine one or more least significant bits of the data sampled for each period of the one or more switching periods to generate a set of least significant bits.

Clause 8. The controller circuit of clause 7, wherein the set of bits comprises the set of least significant bits.

Clause 9. The controller circuit of clause 7, wherein, to generate the set of bits, the controller circuit is configured to initialize the random number generator using the set of least significant bits.

Clause 10. The controller circuit of any of clauses 7 or 9, wherein, to generate the set of bits, the controller circuit is configured to input the random number generator with one or more of the set of least significant bits or a previous output of the random number generator as a feed.

Clause 11. The controller circuit of any of clauses 7-10, wherein the one or more switching periods comprises at least a first switching period and a second switching period and wherein, to determine the least significant bit of the data sampled, the controller circuit is configured to: determine one or more first least significant bits of the data sampled for the first switching period; determine one or more second least significant bits of the data sampled for the second switching period; and generate the set of least significant bits using the one or more first least significant bits and the one or more second least significant bits.

Clause 12. The controller circuit of clause 11, wherein, to generate the set of least significant bits, the controller circuit is configured to add at least the first set of least significant bits and the second set of least significant bits to a first in, first out (FIFO) array.

Clause 13. The controller circuit of any of clauses 7-13, wherein the data sampled at a motor comprises one or more of: a phase or supply voltage; a phase or supply current; a temperature; or a rotor position of the motor.

Clause 14. The controller circuit of any of clauses 7-13, wherein, to control the switching circuit, the controller circuit is configured to generate a switching signal at the switching frequency to comprise a duty cycle.

Clause 15. The controller circuit of clause 14, wherein the controller circuit is configured to determine the duty cycle based on the data measured at the motor.

Clause 16. A method comprising: generating, using a random number generator, a set of bits; determining a switching frequency using the set of bits; and controlling a switching circuit to switch at the switching frequency to drive a motor.

Clause 17. The method of clause 16, wherein the random number generator comprises one or more of a cryptographic function, a pseudo-random number generator, or a true random number generator.

Clause 18. The method of clauses 16 or 17, wherein determining the switching frequency comprises: determining a frequency change value based on the set of bits; and determining the switching frequency using the frequency change value and a frequency value.

Clause 19. The method of clauses 16 or 17, wherein determining the frequency change value comprises scaling the set of bits to generate the frequency change value.

Clause 20. A system comprising: a switching circuit; an random number generator; and a controller circuit configured to: generate, using the random number generator, a set of bits; determine a switching frequency using the set of bits; and control the switching circuit to switch at the switching frequency to drive a motor.

Various aspects have been described in this disclosure. These and other aspects are within the scope of the following claims.

What is claimed is:

1. A controller circuit configured to:
generate, using a random number generator, a set of bits, the random number generator comprising an analog-to-digital converter (ADC), wherein, to generate the set of bits, the controller circuit is configured to:
determine, using the ADC, data sampled at a motor for each period of one or more switching periods; and
determine one or more least significant bits of the data sampled for each period of the one or more switching periods to generate a set of least significant bits;
determine a switching frequency using the set of bits; and
control a switching circuit to switch at the switching frequency to drive the motor.

2. The controller circuit of claim 1, wherein the random number generator comprises a cryptographic function.

3. The controller circuit of claim 1, wherein, to determine the switching frequency, the controller circuit is configured to:
determine a frequency change value based on the set of bits; and
determine the switching frequency using the frequency change value and a frequency value.

4. The controller circuit of claim 3, wherein, to determine the frequency change value, the controller circuit is configured to scale the set of bits to generate the frequency change value.

5. The controller circuit of claim 3, wherein, to determine the switching frequency, the controller circuit is configured to:
determine an index value based on the set of bits; and
determine, using the index value, a predetermined value of an array as the frequency change value.

6. The controller circuit of claim 1, wherein, to determine the switching frequency, the controller circuit is configured to:
determine an index value based on the set of bits; and
determine, using the index value, a predetermined value of an array as the switching frequency.

7. The controller circuit of claim 1, wherein the set of bits comprises the set of least significant bits.

8. The controller circuit of claim 1, wherein, to generate the set of bits, the controller circuit is configured to initialize the random number generator using the set of least significant bits.

9. The controller circuit of claim 1, wherein, to generate the set of bits, the controller circuit is configured to input the random number generator with one or more of the set of least significant bits or a previous output of the random number generator as a feed.

10. The controller circuit of claim 1, wherein the one or more switching periods comprises at least a first switching period and a second switching period and wherein, to determine the least significant bit of the data sampled, the controller circuit is configured to:
determine one or more first least significant bits of the data sampled for the first switching period;
determine one or more second least significant bits of the data sampled for the second switching period; and
generate the set of least significant bits using the one or more first least significant bits and the one or more second least significant bits.

11. The controller circuit of claim 10, wherein, to generate the set of least significant bits, the controller circuit is configured to add at least the one or more first least significant bits and the one or more second least significant bits to a first in, first out (FIFO) array.

12. The controller circuit of claim 1, wherein the data sampled at a motor comprises one or more of:
a phase or supply voltage;
a phase or supply current;
a temperature; or
a rotor position of the motor.

13. The controller circuit of claim 1, wherein, to control the switching circuit, the controller circuit is configured to generate a switching signal at the switching frequency to comprise a duty cycle.

14. The controller circuit of claim 13, wherein the controller circuit is configured to determine the duty cycle based on the data sampled at the motor.

15. The controller circuit of claim 1, wherein the random number generator comprises a true random number generator.

16. A method comprising:
generating, using a random number generator, a set of bits, the random number generator comprising an analog-to-digital converter (ADC), wherein generating the set of bits comprises:
determining, using the ADC, data sampled at a motor for each period of one or more switching periods; and
determining one or more least significant bits of the data sampled for each period of the one or more switching periods to generate a set of least significant bits;
determining a switching frequency using the set of bits; and
controlling a switching circuit to switch at the switching frequency to drive the motor.

17. The method of claim 16, wherein the random number generator comprises one or more of a cryptographic function or a true random number generator.

18. The method of claim 16, wherein determining the switching frequency comprises:
determining a frequency change value based on the set of bits; and
determining the switching frequency using the frequency change value and a frequency value.

19. The method of claim 18, wherein determining the frequency change value comprises scaling the set of bits to generate the frequency change value.

20. A system comprising:
a switching circuit;
a random number generator comprising an analog-to-digital converter (ADC); and
a controller circuit configured to:
generate, using the random number generator, a set of bits, wherein, to generate the set of bits, the controller circuit is configured to:
determine, using the ADC, data sampled at a motor for each period of one or more switching periods; and
determine one or more least significant bits of the data sampled for each period of the one or more switching periods to generate a set of least significant bits;
determine a switching frequency using the set of bits; and
control the switching circuit to switch at the switching frequency to drive the motor.

\* \* \* \* \*